United States Patent [19]

Loren

[11] 4,410,217
[45] Oct. 18, 1983

[54] ANTI-THEFT WHEEL COVER

[75] Inventor: Norman Loren, Warren, Mich.

[73] Assignee: Michael Ladney, Jr., Grosse Pointe Shores, Mich.

[21] Appl. No.: 321,625

[22] Filed: Nov. 16, 1981

[51] Int. Cl.³ .............................. B60B 7/04; B60B 7/06
[52] U.S. Cl. ............................... 301/37 AT; 301/37 P; 301/37 SS; 301/37 SC
[58] Field of Search ........... 301/37 R, 37 AT, 37 SC, 301/37 S, 37 CM, 37 SS, 37 P, 108 R, 108 S, 108 SC; 70/168, 422, 258, 259

[56] References Cited

U.S. PATENT DOCUMENTS

| | | |
|---|---|---|
| 2,109,684 | 3/1938 | Short . |
| 2,722,822 | 11/1955 | Thomas . |
| 2,727,790 | 12/1955 | Gaylord ........................ 301/37 SC |
| 2,971,798 | 2/1961 | Lyon . |
| 3,170,733 | 2/1965 | Lamme . |
| 3,833,266 | 9/1974 | Lamme . |
| 3,918,764 | 11/1975 | Lamme . |
| 4,083,606 | 4/1978 | Scruggs . |
| 4,229,048 | 10/1980 | Brinson ........................ 301/37 SS |
| 4,306,751 | 12/1981 | Wegner . |
| 4,346,940 | 8/1982 | Tatar ............................ 301/37 AT |

Primary Examiner—Charles A. Marmor
Attorney, Agent, or Firm—Barnes, Kisselle, Raisch, Choate, Whittemore & Hulbert

[57] ABSTRACT

An annular bendable sheet metal bracket which may be a decorative hub is fixed to a wheel cover outwardly from the central portion thereof. The central portion of the bracket is adapted to be locked to a fixed central portion of the wheel. When it is attempted to remove the cover from the wheel without releasing the lock, the bracket distorts while the cover remains intact.

9 Claims, 5 Drawing Figures

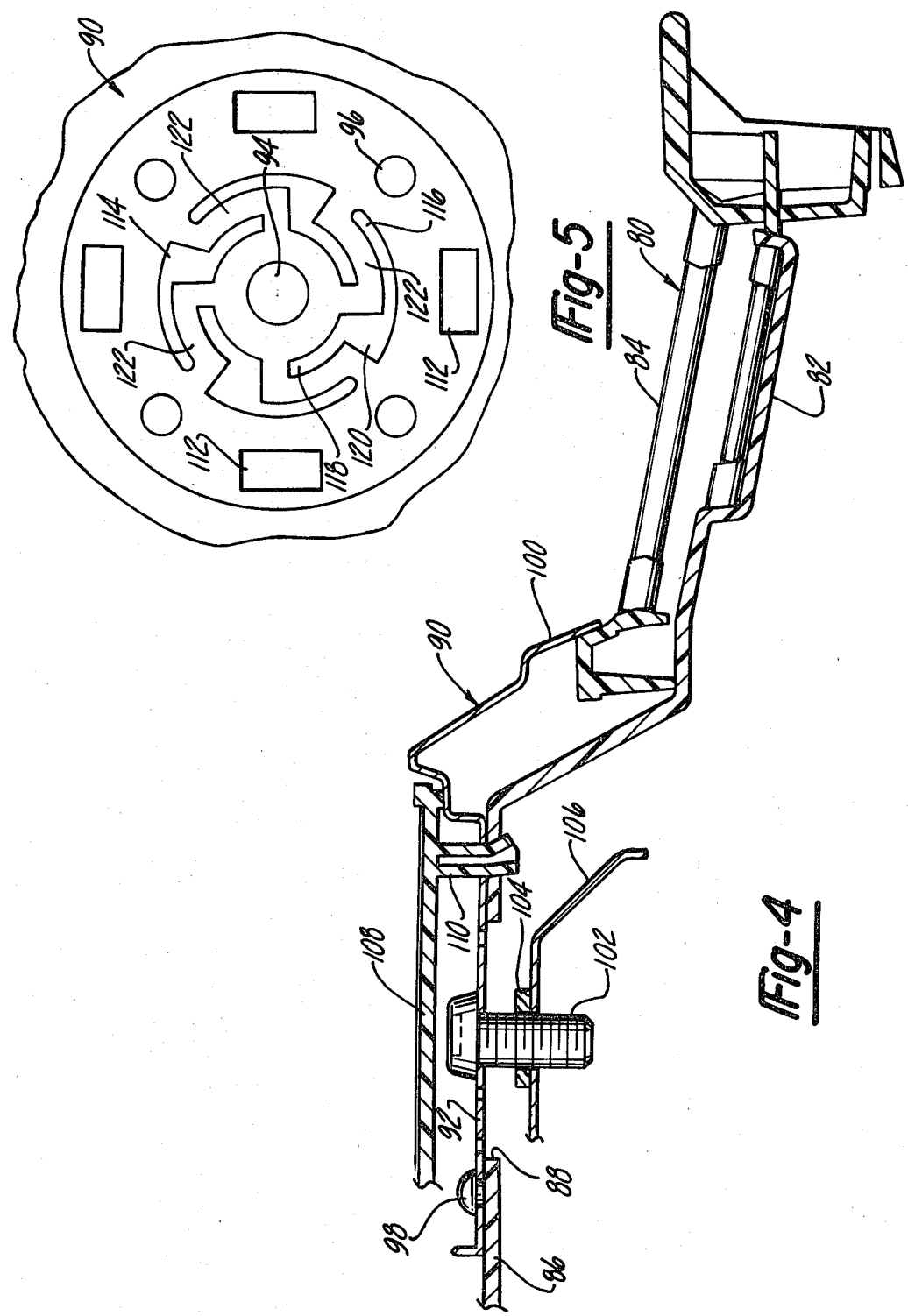

ANTI-THEFT WHEEL COVER

This invention relates to wheel covers and, more particularly, to anti-theft wheel covers, that is, covers of the type adapted to be locked to a wheel.

Various types of anti-theft wheel covers have been proposed heretofore which are very effective with respect to their ability to lock the cover on the wheel. However, prior art covers of this type have at least one serious disadvantage. Some present day wheel covers are very expensive and, when locked on a vehicle wheel in accordance with prior art arrangements, they are destroyed or damaged beyond repair when one attempts to remove the cover from the wheel without releasing the locking mechanism. This is especially true of plastic wheel covers. Such destruction or damage frequently occurs because it is not always apparent that the cover is of the locking type and a thief will attempt to remove it from a wheel on the assumption that he merely has to pry the cover off the wheel in a conventional manner.

The present invention has for its primary object the provision of an anti-theft wheel cover so designed that only a relatively inexpensive component thereof may be damaged as a result of an unauthorized attempt to remove the cover from a wheel.

A more specific object of the present invention resides in the provision of a locking type wheel cover having a readily bendable bracket permanently attached to the body of the wheel cover. The bracket, rather than the body of the wheel cover, is designed to be engaged by the locking mechanism so that, if a thief attempts to remove the cover from the wheel without releasing the lock, the bracket distorts without damaging the wheel cover body.

Other objects, features and advantages of the present invention will become apparent from the following description and accompanying drawings, in which:

FIG. 4 is a fragmentary sectional view of a wheel cover having a bendable bracket in the form of a decorative hub of modified form secured thereto; and FIG. 5 is a fragmentary plan view of the bracket illustrated in FIG. 4.

Figure 1:
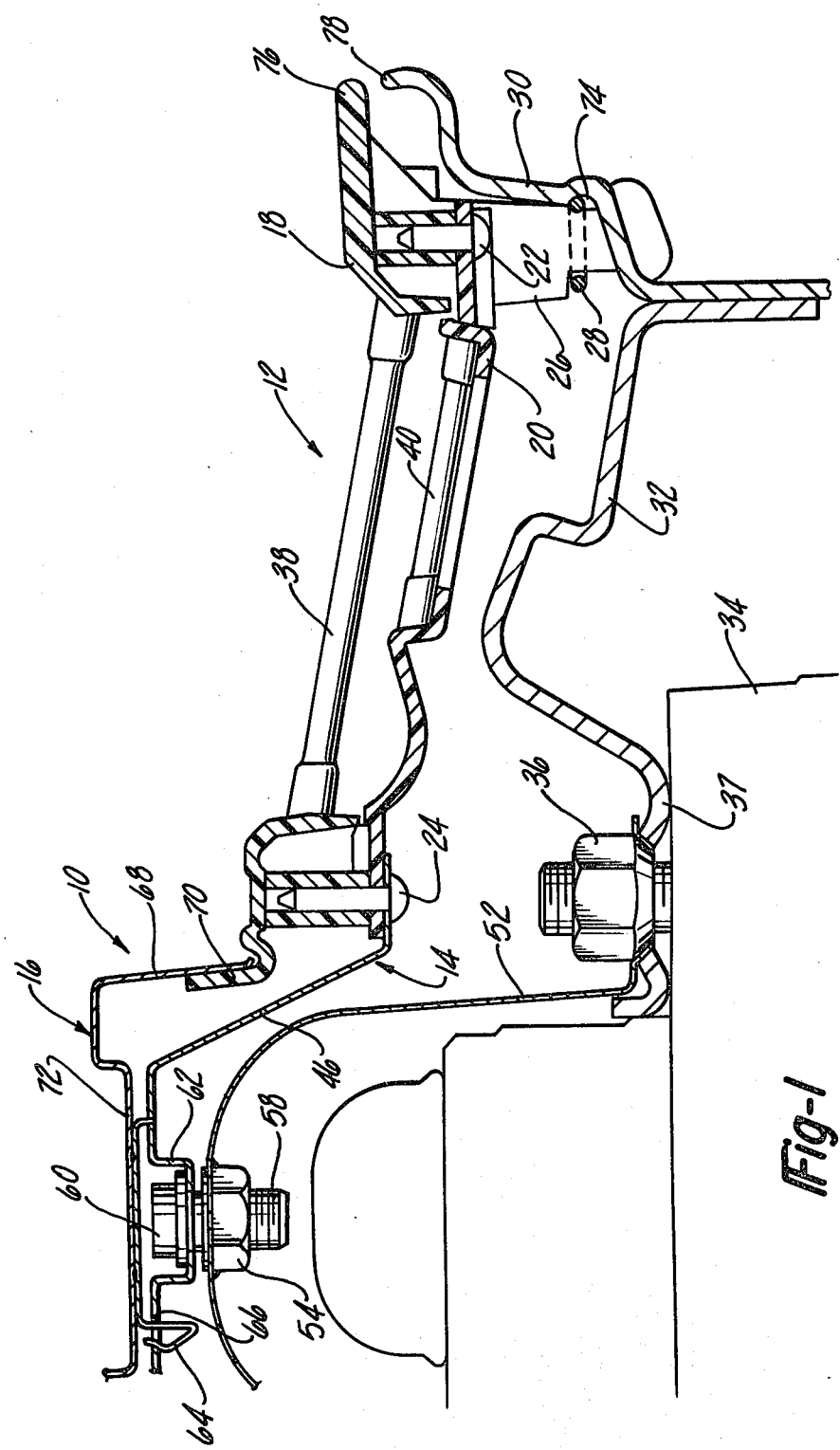
FIG. 1 is a fragmentary sectional view of a wheel cover according to the present invention mounted on a vehicle wheel.

The wheel cover 10 illustrated in FIG. 1 comprises a wheel cover body 12 having a bracket 14 secured thereto and an ornamental disc 16 releasably engaging bracket 14. In the embodiment illustrated body 12 is molded from plastic and comprises an axially outer section 18 and an axially inner section 20. These sections are secured together in stacked relation by a plurality of circumferentially spaced fasteners 22,24. The axially outer section 18 is molded with a plurality of circumferentially spaced lugs 26 with which a wheel-engaging retainer ring 28 is engaged for retaining the cover on the rim 30 of a vehicle wheel, the body section 32 of which is adapted to be mounted on an axle hub 34 by means of the conventional lug nuts 36 around the bolt-on flange 37 of the wheel. The arrangement of lugs 26 and retainer ring 28 is of the type shown in U.S. Pat. No. 4,027,919. However, insofar as the present invention is concerned, any suitable means may be utilized for releasably mounting the cover on a wheel rim. The particular wheel cover illustrated includes radial spoke members 38,40 which are merely illustrative of one type of wheel cover that simulates a wire spoke wheel.

According to the present invention the wheel cover body 12 has bracket 14 permanently secured thereto. In the arrangement illustrated in FIGS. 1 through 3 bracket 14 is of generally cup shape and includes a bottom wall 42, a peripheral flange 44, and a plurality of outwardly inclined legs 46 which extend between the bottom wall 42 and the peripheral flange 44. As is clearly illustrated in FIG. 2, the four legs 46 are spaced apart circumferentially by cut outs or notches 48 in the inclined portion of the bracket. Bracket 14 is preferably stamped from a light gage sheet metal and may be permanently attached to the inner peripheral portion of the wheel body cover 12 by the fasteners 24 which secure the two members 18,20 of the cover together. To accommodate these fasteners, the peripheral flange 44 is formed with apertures 50.

To enable locking the wheel cover on a vehicle wheel it is essential that one of the components of the locking arrangement is securely mounted on the wheel. In the arrangement illustrated, the lock retaining member comprises an inverted sheet metal cup 52 securely mounted on the wheel by means of the wheel lugs 36. The member 52 is of substantially rigid construction and preferably has a weld or clinch nut 54 fixed thereto at the central portion thereof. The bottom wall 42 of bracket 14 is centrally apertured, as at 56, to receive a locking bolt 58 adapted for threaded engagement with nut 54. Bolt 58 has an enlarged head 60 and is preferably of the "McGard" type; that is, the head of the bolt is formed with a socket or recess of special configuration which prevents rotation of the bolt except by means of a special key wrench. After the cover is mounted on the wheel rim, bolt 58 is inserted through the central opening 56 in bracket 14 and threaded into nut 54 so that the underside of the bolt head 60 bears against the recessed central portion 62 of bracket 14. This effectively locks the cover on the wheel and prevents unauthorized removal therefrom. If desired, instead of a bolt and nut arrangement as shown, the locking mechanism may comprise a conventional key-operated cylinder lock. The locking mechanism is preferably concealed by the ornamental disc 16 which has a series of tabs 64 on the inboard face thereof adapted for releasable engagement with bracket 14 by means of apertures 66 in the bottom wall 14 of the bracket. Disc 16 has an annular skirt 68 adapted to telescope over an axially outwardly extending annular flange 70 on the wheel cover body. If desired, a medallion or other ornamentation may be applied to the central portion of disc 16.

The cover is designed to be mounted on the wheel rim in any conventional manner, such as by engaging the wheel retaining member, that is, ring 28 in the embodiment illustrated in FIG. 1, with the conventional safety groove 74 in the wheel rim. Thereafter the cover is then locked to the wheel by engaging bolt 58 with nut 54. The ornamental disc 16 is then applied to the cover to conceal the locking mechanism.

If someone attempts to remove the cover from the wheel without disengaging the locking mechanism, he would normally insert a prying tool between the outer peripheral flange 76 of the wheel cover and the peripheral portion 78 of the rim and manipulate the tool to displace the cover axially outwardly. Since the prying force is applied to the outermost peripheral portion of the cover and since the cover is locked to the wheel only at the central portion thereof by the bracket 14 which is secured to the cover at locations (fasteners 24) spaced radially relatively closely to the lock mechanism, it follows that the outer periphery of bracket 14 is subjected to a substantially greater leverage than the outer peripheral portion of the cover. This leverage, coupled with the fact that the legs 46 of bracket 14 are formed of a readily bendable material, causes the bracket 14 to bend between the fasteners 24 and the bolt 60 without distorting or otherwise destroying the cover itself, even though the cover may be formed of relatively light construction. Therefore, after one section of the cover flange 76 has been forced, as by the prying tool, away from the adjacent portion of the rim, it is impractical to apply an additional prying force, except manually. Normally a manual pry off force applied to the cover will be inadequate to destroy the cover or to separate the cover from bracket 14 at the fastening members 24. Thus, an unauthorized attempt to remove the cover from the wheel will result in the distortion of bracket 14, but lack of success in removing the cover from the wheel. When this occurs it is a relatively simple matter to replace or repair the relatively inexpensive distorted bracket 14 with another bracket and, thus, restore the wheel cover as a whole to a usable condition.

In the embodiment illustrated in FIGS. 4 and 5 the wheel cover 80 likewise comprises an axially inner member 82 and an axially outer member 84 which are secured together in any suitable fashion. The inner member 82 has a central annular flange 86 at the central portion thereof which defines a central opening 88 in the cover. An annular bracket 90 has a central portion 92 overlying opening 88 provided with a smaller central opening 94. A plurality of fastener openings are spaced radially outwardly from the central opening 94. Bracket 90 is secured to flange 86 by rivets 98 or other suitable fastening methods. Bracket 90 is fashioned with an outer peripheral flange 100 which is shaped and designed to provide an ornamental hub or disc which overlies the central portion of the cover. The cover is adapted to be locked to the wheel by means of the McGard screw 102 engaging the nut 104 fixedly secured to a cup 106 which is attached to the wheel hub in any suitable manner, such as, for example, shown in FIG. 1. If desired, a molded plastic medallion 108 is adapted to be releasably engaged with the wheel cover by means of flexible fingers 110 engageable with registering openings 112 in bracket 90 and flange 86 of the wheel cover.

Figure 2:
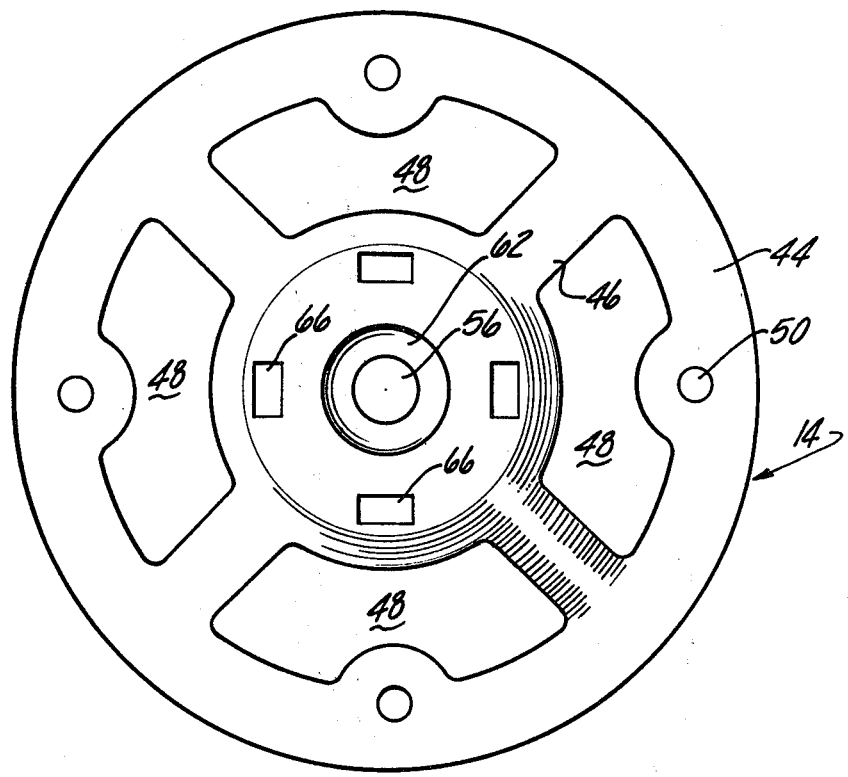
FIG. 2 is a plan view of the bendable bracket.
Figure 3:
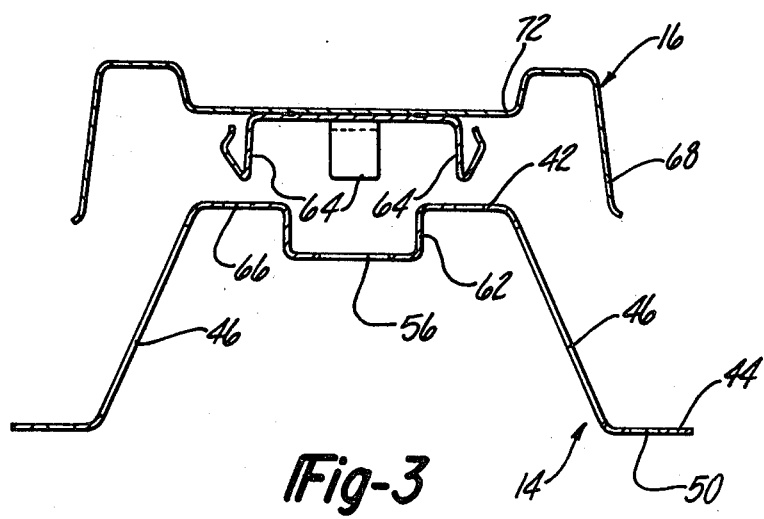
FIG. 3 is an exploded sectional view of the bracket and the ornament disc on the wheel cover.

As is true of the bracket 14 illustrated in FIGS. 1 through 3, bracket 90 is also formed so as to be readily distortable between the central portion thereof engaged by the head of screw 102 and the fastening members 98. In this particular embodiment the bracket is formed with a plurality of notches or lances 114 at the circumferential portion thereof between the central opening 94 and the fastener openings 96. As shown in FIG. 5, each notch 114 is preferably in the form of two radially and circumferentially spaced arcuate notches 116,118 which are interconnected at their adjacent ends by radially extending notch 120. This arrangement of notches forms a plurality of relatively narrow, circumferentially extending fingers 122 interconnecting the central portion of bracket 90 with the outer portion thereof in which the fastener openings 96 are formed. In the embodiment illustrated in FIG. 5 four such circumferential fingers 122 are provided.

In operation bracket 90 functions in a manner similar to the bracket 14 illustrated in FIGS. 1 through 3. When it is attempted to pry the wheel cover off of the wheel by simply releasing the rim-engaging members (not shown in FIG. 4), the screw 102 will firmly retain bracket 90 on the wheel and the fasteners 98 will securely retain the bracket on the cover. However, a prying force at the periphery of the wheel will result in distortion of the thin bendable fingers 122 without destroying the cover. This is enhanced by the fact that a prying force at the outer periphery of the wheel produces a very substantial leverage on bracket 90 between fasteners 98 and the central locking bolt 102. As stated previously in connection with the embodiment illustrated in FIGS. 1 through 3, this feature of the present invention prevents destruction or damage to the expensive wheel cover body while preventing its removal from the wheel and only results in distortion of bracket 90 which is relatively inexpensive and can be easily replaced.

The arrangement illustrated in FIGS. 4 and 5 is a particularly desirable construction. It will be appreciated that with this arrangement, even if the pry off force applied to the cover is sufficient to shear or strip the rivets 98 which secure bracket 90 to the cover body, as long as screw 102 remains connected to the nut 104, the cover cannot be completely removed from the wheel. The cover is trapped on the wheel by the overlying hub provided by bracket 90.

The provision of a readily bendable bracket such as illustrated at 14 and 90 has another advantage. The axial dimension of wheels of different manufacturers vary substantially even though the wheels are of the same nominal diameter. The axial distance between the safety groove 74 and the bolt-on flange 37 may vary as much as one-half inch or more on wheels of different manufacturers. However, since the brackets 14,90 are readily bendable, the same bracket can be utilized on wheel covers for application to such wheels of different manufacturers without modifying the lock mechanism, regardless of whether a McGard screw or a key lock is employed. The bracket is bendable to accommodate such variations in axial dimensions.

I claim:

1. An anti-theft cover for a vehicle wheel comprising a cover body adapted to be applied to the outer face of a vehicle wheel, means around the outer peripheral portion of the cover body for releasably mounting the cover on a vehicle wheel, a metal bracket extending across the central portion of the cover body, said bracket having an outer peripheral portion having a diameter substantially less than the outer peripheral portion of the cover body, means axially connecting the outer peripheral portion of said bracket with the axially adjacent portions of the cover body, said bracket also having a central portion, the radially intermediate portions of said bracket being apertured to form a plurality of circumferentially spaced, readily bendable legs extending between and interconnecting the central and outer peripheral portions of the bracket, the central portions of said bracket and cover body having registering central openings therein, a cover locking member extending axially through said registering openings and having a head portion engaging the axially outer face portions of said bracket surrounding the opening therein, the portion of the locking member extending through said openings being adapted to engage and releasably lock with a cooperating member fixed on the wheel to retain the cover on the wheel in the event of disengagement of the releasable mounting means from the wheel.

2. A wheel cover as called for in claim 1 including an ornamental member releasably mounted on the cover body and overlying said locking member.

3. A wheel cover as called for in claim 1 wherein said locking member comprises a stud.

4. An anti-theft cover for a vehicle wheel comprising a cover body adapted to be applied to the outer face of a vehicle wheel, means around the outer peripheral portion of the cover body for releasably mounting the cover on a vehicle wheel, a bendable metal bracket fixedly secured to the cover body at circumferentially spaced points which are located radially substantially closer to the center of the cover than the outer periphery thereof, said bracket extending over the central portion of the cover body, said cover body having a central opening therein, said bracket having a central portion provided with a central opening therein registering with and of smaller size than the central opening in the cover body, said bracket having a plurality of legs extending between its central portion and the portions thereof attached to the cover body, a cover locking member extending through said openings and having a portion thereof engaging the outer face of said bracket, the portion of the locking member extending through said openings being adapted to engage a cooperating member fixed on the wheel to retain the cover on the wheel in the event of disengagement of the mounting means from the wheel.

5. A wheel cover as called for in claim 4 wherein the bracket is secured to the cover body adjacent the radially outer ends of the legs.

6. A wheel cover as called for in claim 5 wherein the radially outer ends of said legs are interconnected by a peripheral flange.

7. A wheel cover as called for in claim 6 wherein said bracket is secured to the cover body by fastening means extending through said flange.

8. A wheel cover as called for in claim 4 wherein the radially inner ends of said legs are staggered circumferentially from the radially outer ends thereof, the portions of said legs intermediate the radially inner and outer ends thereof extending generally circumferentially and being distortable in a direction axially of the cover when a pry-off force is applied to the outer peripheral portion of the cover.

9. A wheel cover as called for in claim 4 wherein said legs extend generally circumferentially around the central portion of said bracket.

* * * * *